United States Patent [19]

Stephan

[11] 3,985,900

[45] Oct. 12, 1976

[54] UREA-TREATING FISH EGG BAIT IN ACID MEDIUM

[76] Inventor: John Thomas Stephan, 13 Mount Hood Lane, Longview, Wash. 98632

[22] Filed: Aug. 1, 1975

[21] Appl. No.: 601,132

[52] U.S. Cl. ............................................. 426/1
[51] Int. Cl.² ...................................... A23L 1/325
[58] Field of Search ........................ 426/1; 260/117; 252/316; 424/36, 37

[56] References Cited
UNITED STATES PATENTS

| | | |
|---|---|---|
| 1,358,985 | 11/1920 | Picht ........................................ 426/1 |
| 1,703,324 | 2/1929 | Sellen ....................................... 426/1 |
| 2,932,572 | 4/1960 | Sarich ....................................... 426/1 |
| 2,951,761 | 9/1960 | Stephan ..................................... 426/1 |

*Primary Examiner*—A. Louis Monacell
*Assistant Examiner*—R. A. Yoncoskie
*Attorney, Agent, or Firm*—Eugene D. Farley

[57] ABSTRACT

Fish eggs which have been rendered hard and substantially opaque by coagulation of their protein content are made into fish egg bait by treating them with an aqueous acid solution of urea, i.e. with an acid salt of urea, and under conditions predetermined to swell and plasticize the eggs and render them substantially translucent.

22 Claims, 3 Drawing Figures

3,985,900

UREA-TREATING FISH EGG BAIT IN ACID MEDIUM

BACKGROUND OF THE INVENTION

This invention relates to fish egg baits. It pertains particularly to a process of making from fish eggs, particularly from salmon eggs, improved bait eggs which more closely resemble natural fish eggs, with respect to their tactile and optical properties. In particular, the fish egg bait which is the product of the process of the present invention resembles natural fish eggs more closely than do the fish egg baits of the prior art with respect to plumpness, color, degree of translucency or transparency, and by being plastic or rubbery to the touch.

As is well known salmon eggs are a natural food for trout which coexist with the salmon in the spawning streams. For this reason salmon egg bait is a preferred bait for trout and has been available commercially for a long period of time.

To be suitable for this use, the fish egg bait of commerce must fulfill several requirements which are difficult of fulfillment.

Thus the eggs should be plump and have a normal shape and appearance. Their consistency should be uniform and plastic. Their color should be appropriate. They should be large enough to make it possible to impale them successfully on a hook. They should be tough enough so that when so impaled they will remain on the hook and withstand the stresses of casting. Their taste and texture should not be distasteful to a biting fish.

My U.S. Pat. No. 2,951,761 discloses a process for the preparation of fish egg bait which comprises a combination brine, heat and formaldehyde treating process for toughening and preserving fish eggs to make them suitable for use as bait. While the bait eggs produced by this process constitute a substantial article of commerce, the eggs tend to be hard, opaque, and whitish in color. In these important respects they accordingly are dissimilar to natural eggs.

In the foregoing and analagous prior art processes, an attempt is made to camouflage the eggs and overcome their unnatural color by dying the eggs with red, orange or fluorescent dyes. However this does not mask entirely the unnatural appearance of the bait.

In my copending patent application Ser. No. 601,133 filed Aug. 1, 1975 for UREA-TREATED FISH EGG BAIT, a process is disclosed for converting fish eggs to fish egg bait by first treating the eggs in a saline solution with heat and/or with formaldehyde, or other chemical hardening agents, for protein, until the eggs have become hard and opaque. Thereafter the hardened and opacified eggs are soaked in an aqueous urea solution. This introduces urea into the eggs and works a remarkable and beneficial conversion by which the eggs become plasticized and rubbery, instead of hard; translucent or transparent instead of opaque; and swollen to an extent such that they attain a size which makes them more suitable for use as fish bait.

It is the general purpose of the present invention to provide a urea-treating process for converting fish eggs to fish egg bait which process is much more rapid than is the process set forth in my above identified patent application, and which surprisingly leads to the production of a fish egg bait product which is of a greatly increased size, for example from 2 to 3 times the size of the eggs from which the product is derived.

These two advantages obviously are of the greatest commercial significance.

The increased speed of reaction decreases markedly the time required for manufacturing the bait product and cuts manufacturing costs correspondingly. Increasing the size of the eggs by two or threefold makes possible producing two or three times the amount of finished product from a given amount of fish egg feedstock, thereby increasing the market value of the fish egg bait product by a corresponding factor. It should be noted in this regard that the fish egg feed stocks for use in the presently described process are very expensive, costing several dollars a pound at the fish processing houses. Considering this, the economic advantage of hugely increasing the size of the eggs without degrading their other properties is immediately apparent.

Also apparent is the fact that the presently described process makes possible the utilization of eggs having such a small size that they otherwise could not be used as a feedstock. In other words, tiny eggs which are not of sufficient size to be impaled on a hook, or if so impaled fail to cover the hook satisfactorily, are swollen by the presently described process to a degree such that they become suitable for this purpose.

Further objects of the present invention are the provision of a bait fish eggs having the foregoing desirable attributes and which additionally are tough so that when impaled on a hook they will withstand casting; which have a taste not unpleasant to fish; and which may be preserved effectively so that when marketed they have a long shelf life.

SUMMARY OF THE INVENTION

I have discovered that the foregoing and other objects of this invention may be accomplished by the provision of a process for making fish egg bait which comprises the following steps:

First, raw fish eggs, which normally occur in skeins are preferably singled.

Secondly, the skins of the singled eggs are toughened by treating the eggs with saline solution.

Third, optionally, the eggs with toughened skins are separated from the saline solution and stored under refrigeration until they are needed.

Fourth, the stored eggs, which may have become misshapen during storage, are plumped by treating with a further quantity of saline.

Fifth, the plumped eggs are hardened by treatment with a protein coagulating agent such as aqueous formaldehyde and heat.

Sixth, the hardened eggs, which are opaque and white, are treated at an acid pH with an aqueous acid solution of urea, i.e. with an acid urea salt, to render them translucent or transparent, and to plasticize the protein so that the eggs become plastic or rubbery to the touch, rather than hard.

Seventh, the urea treated eggs are, if desired, subjected to the action of dyes or preservatives as indicated or required.

The invention also comprehends the urea containing, plasticized, translucent fish egg bait produced by the foregoing process.

DESCRIPTION OF SPECIFIC EMBODIMENTS OF THE INVENTION

The invention is described with particular reference to the drawings, comprising a series of graphs wherein.

Figure 1:
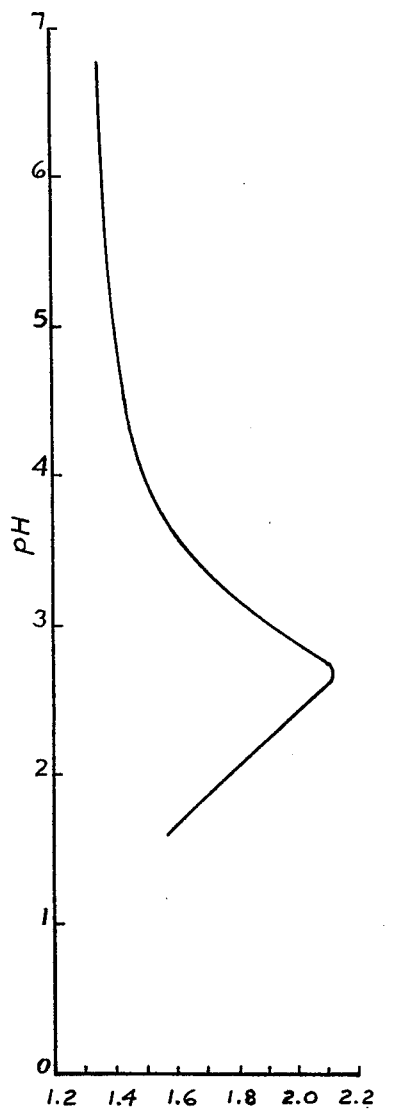
FIG. 1 (urea hydrochloride) illustrates the effect of the degree of acidity of the treating solution on the swelling of fish eggs upon treating them with a solution of urea acidified with hydrochloric acid.

The feed stock for the execution of the process of my invention comprises the eggs of fish usually taken commercially at various stages of egg development. The fish may be of any species, provided they possess roe of sufficient size to be suitable for use as fish bait.

Salmon roe comprise the feed stock of greatest potential importance since it is available in large quantities at commercial fish packing plants, particularly in the Pacific Northwest.

Typical fish species from which the eggs may be derived thus comprise the Chinook or King Salmon, the Chum or Dog Salmon, the Coho or Silver Salmon, the Pink or Humpback Salmon, the Sockeye Salmon and the Atlantic Salmon. However, eggs from other fish such as the halibut, sturgeon, cod or any variety of salt water or fresh water fish may be used.

SINGLING THE EGGS

Because of the diversity of size, condition, and state of development of the eggs constituting commercial fish roe, in the hereindescribed process for making fish egg bait first it is preferred to process the roe to convert all of the eggs to the condition of single eggs, i.e. to "single" the eggs.

All fish eggs as they are obtained from the fish processing plant are surrounded by a gelatinous proteinaceous serum. When immature, they are bound together by membraneous materials into skeins.

To convert this heterogeneous mass of roe into single eggs, the more or less single eggs from the mature fish are combined with the egg skeins from the immature fish and the mass rubbed over nylon screens and washed. This effects the desired separation and produces a single egg stock suitable for use in the next step of the processing.

SKIN TOUGHENING

The next step in the process has for its purpose toughening the skin of the eggs to make them more durable and thus more suitable for the subsequent processing stages.

Fish eggs as obtained from the fish comprise a protective outer skin and proteinaceous fluid surrounded by skin. The protective membrane ruptures rather readily, particularly in mature eggs, with the result that the eggs pop or squirt if they are pressed or punctured. Since the processing steps to which the eggs are to be subjected involve mechanical handling of the eggs, it is desirable to toughen their skins so that they will not rupture.

To toughen their skins, the fish eggs are treated with saline solution, preferably a solution of sodium chloride or of calcium chloride. In effectuating the process the singled eggs are immersed in a concentrated brine which is from 50% to 100% saturated with the selected salt. Use of a saturated sodium chloride brine at about ambient temperature is preferred. The eggs are left in the brine until their skins have been toughened. This requires from about 10 to about 30 minutes, preferably from about 15 to about 20 minutes.

After the skin-toughening step has been completed, the eggs are separated from the brine and stored substantially dry, i.e. with the occluded residual brine only. Under refrigeration at a temperature of from 33° to 45° F. they may be stored indefinitely in this form. If preferred, however, they may be stored in dilute brine, pending their requisition to meet plant schedules.

PLUMPING

The singled eggs which have been stored substantially dry and under refrigeration for a period of time tend to have nonspherical, distorted, flattened shapes due to compaction and storage. To convert them to satisfactory fish bait, it is necessary to restore them to their original approximately spherical shape prior to further processing.

This is accomplished by suspending the storage eggs in water or dilute saline solution having a concentration of from 0.1% to 100% saturated. Preferably, the brine employed has the same or approximately the same concentration as does that employed in the subsequent processing operations. The brine temperature should lie preferably about in the range of from just above the freezing temperature of the brine to about 150° F., ambient temperature.

The distorted eggs from storage are suspended in the brine for at least one hour, preferably about 24 hours, during which time they regain their original substantially spherical shape.

HARDENING

As noted above, the liquid content of the fish eggs comprises primarily proteinaceous materials. Such proteinaceous materials are susceptible to gelation upon heating and/or upon treatment with various chemicals. Accordingly, in the instant process, advantage is taken of this property to convert the eggs having liquid centers to eggs having solid centers which can be impaled upon a fish hook and when once impaled will be retained there by the barb of the hook. A combination formaldehyde and heat treatment is employed for this purpose.

In carrying out the hardening step, the eggs are suspended in saline, particularly sodium chloride or calcium chloride brines. The brine is used in a concentration of from 0.1 to 100% saturated. Preferably the brine employed is the same as that used for plumping the eggs, the plumping step being merely a preliminary operation preceding the hardening operation.

Formaldehyde in the desired amount for reaction is added to the brine and allowed to penetrate the eggs. The formaldehyde may be employed per se in the form of its aqueous solutions, or in the form of compounds which liberate formaldehyde under the conditions of treating the eggs. Such a compound is paraformaldehyde.

But a relatively small amount of formaldehyde is required, specifically from 0.2 to 0.7 pounds, and preferably from 0.3 to 0.6 pounds of formaldehyde, calculated as 100% formaldehyde, per 100 pounds of eggs.

The amount of formaldehyde required varies with the degree of plasticity and translucency desired in the egg products. It also varies with the variety of salmon eggs and their geographical origin, the presence of any preservatives or other additives, the salt concentration, the treating time, etc. In general, the higher the salt concentration the less formaldehyde is required to achieve a given level of hardness. The longer the contact time between the egg and the formaldehyde solution at room temperature, the less formaldehyde is required in the solution to achieve a given level of hardness and plasticity in the finished egg products.

The temperature of treatment preferably is substantially room temperature, and the time is from 1 to about 48 hours.

During this preliminary treatment with formaldehyde, the formaldehyde uniformly hardens the skins of the eggs and assists in hardening the egg interiors. At the conclusion of the formaldehyde treatment, the eggs preferably are drained free of the formaldehyde-containing solution to terminate the absorption of formaldehyde by the eggs.

COOKING

The eggs which have been toughened and partially hardened by treatment with formaldehyde next are cooked to coagulate the protein further and render the eggs harder. The cooking also renders the eggs more susceptible to treating with urea, as will be described more fully hereinafter.

Although it is possible to cook the eggs in the formaldehyde brine in which they have been treated in the step immediately preceding, it is preferred not to do so because in this event the formaldehyde would continue to react with the substance of the eggs and make the quality of the product more difficult to control.

Accordingly, the eggs are drained free of the formaldehyde containing solution and are resuspended in a saline solution such as an aqueous solution of common salt, or calcium chloride, used in amount sufficient to provide a concentration of from 0.1% by weight salt to a fully saturated solution thereof.

The duration and severity of the cooking conditions are correlated with the severity and extent of the formaldehyde treatment, since these two process steps cooperate in rendering the eggs suitably susceptible to the subsequent urea treatment.

An appropriate method of cooking the eggs is to suspend the eggs in the selected saline solution contained in a wooden barrel, using a sufficient amount of the saline solution to suspend the eggs freely and to promote heat transfer. The mixture then is heated by direct injection of steam of approximately 15 pounds gauge pressure until a cooking temperature of from 175° F. to the boiling point of the solution is reached. A preferred cooking temperature is from 190° to 205° F. In the alternative, the cooking may be carried out in a steam-heated jacketed vessel.

The time of cooking will depend largely upon the cooking temperature. At a cooking temperature of from 190° to 205° F., a cooking time of from about 10 minutes to about 90 minutes is indicated, the longer cooking time being applicable to the lower cooking temperatures and vice versa.

Other variables affecting the cooking temperature are the identity and source of the eggs, the severity of the preliminary formaldehyde treatment, and the concentration of the brine in which the eggs are suspended. The more dilute the brine, the longer the cooking time.

In a typical instance, when cooking fish roe suspended in a brine having a salt concentration of from 25% to 100% of the saturation value, the optimum cooking time at 200° F. will lie in the range of from 20 to 40 minutes.

The end point of the cooking operation is determined by physical examination. The operator samples the eggs from time to time as they cook, cools the samples in cold tap water or cold brine, and evaluates the degree of hardness. The eggs should be cooked to a degree of hardness greater than is desired in the eggs after they have been indurated in the urea solution, a condition which the operator will learn by experience.

After the cooking step has been completed, the cooked eggs are cooled by draining off the hot cooking liquor and placing the cooked eggs in cold water or cold brine only long enough to cool to room temperature. The eggs then are placed in brine, preferably of the same concentration as the cooking liquor. They then may be stored under refrigeration at temperatures of from 33° to 45° for months, pending completion of the processing.

At the conclusion of the formaldehyde and cooking treatments, the eggs are substantially in the condition of the commercially available fish bait eggs of the prior art. They are white in color, opaque and hard to the touch. They are quite dissimilar in these qualities to natural eggs and accordingly are less attractive to fish.

I now have discovered, and it is the essence of the present invention, that the tactile and optical properties of fish eggs treated in the manner described above may be improved so that they become soft and plastic to the touch and translucent or transparent in appearance while at the same time retaining their toughness so that they will remain on the hook when used as fish bait, and without acquiring a taste or other quality which is objectionable to the fish.

These desirable results are obtained by treating the eggs with urea in an aqueous acid medium until the eggs have become swollen, translucent or transparent, and plasticized to a predetermined degree. Without commitment to a particular theory, it appears that urea possesses the unique ability of plasticizing or otherwise altering the heat-and chemical-hardened centers of the eggs, without deleteriously reducing the toughness of the skins. In acid medium, this is accomplished with extreme speed while contemporaneously swelling the eggs to great size i.e. to a size two or three times their original size.

As these changes in egg properties occur, there is a corresponding change in the egg composition in that a substantial amount of urea passes through the membraneous skins of the eggs, no doubt by osmosis, and thereafter becomes a permanent constituent of the egg centers. A sufficient amount of urea passes through the egg skins in this manner to produce a treated egg product which contains as much as 50 % urea, dry egg basis. Within the eggs, the urea produces the above noted changes in tactile and optical properties of the eggs.

TREATMENT WITH UREA

In effectuating the treatment with urea, the eggs are suspended in a suitable saline solution, for example a solution of sodium chloride or calcium chloride which is from 0.1% saturated to saturated with respect to its salt content. Sufficient of the brine is used to secure a uniform suspension of the eggs.

Where cooking has been accomplished in water, or in a brine of low concentration, and the eggs thereafter stored in a brine of higher concentration, it is desirable for successful treatment with urea that the eggs in the new brine be premitted to stand a sufficient length of time to attain equilibrium in regard to brine content. This should be at least 24 hours and in some cases it may be as long as 10 days, the upper time limit in most instances being non-critical. The eggs then are drained substantially free of brine and, if desired, washed with water.

The eggs in the brine solution next are treated with urea in an aqueous acid medium, e.g. an acid medium having a pH no greater than 6, preferably from 1 to 5. This is accomplished by dissolving the urea in water and acidifying the resulting solution to the desired pH with the selected acid. In the alternative, the urea may be added to the mixture either as a solid or as a solution, the mixture being acidified to the selected pH level either before addition of the urea or afterwards.

A wide variety of inorganic and organic acids may be used for this purpose, provided they do not react chemically with, nor degrade the urea, and are of sufficient strength to produce a reaction mixture having the desired pH. A preferred group of acids comprises sulfuric acid, hydrochloric acid, phosphoric acid, sulfamic acid, acetic acid, citric acid, diglycollic acid, oxalic acid, and tartaric acid.

Urea, of course, is a diamide and reacts with acids as an extremely weak organic base. A 40% by weight solution of urea in water has a pH of about 8.7.

As a weak base, urea reacts with acids to form acid salts, by which is meant salts which when dissolved in water produce aqueous solutions having pH's no greater than 6.

This property of urea is demonstrated when urea is titrated with dilute hydrochloric acid.

When 50 ml. of a 40% by weight solution of urea in water (specific gravity of solution equals 1.134 at 63° F.) is titrated with 1.25 normal hydrochloric acid, it requires only 0.15 ml. of the dilute acid to decrease the pH of the urea solution from an original value of pH 8.7 to a value of pH 3.8. However, upon continued titration, the titration curve flattens out. 19.85 Ml. of the dilute hydrochloric acid is required to lower the pH to a level of pH 2. This buffering action of the urea clearly indicates the formation in the aqueous solution of the salt urea hydrochloride. A similar action is observed when urea is titrated with other acids, such as sulphuric acid, phosphoric acid, sulfamic acid, and the stronger organic acids.

It is the acid salts of urea, inherently present in acid urea solutions having a pH no greater than 6 which are responsible for the large improvement in swelling, tactile properties, and optical properties noted when fish eggs are treated with acid urea solutions. This improvement is especially pronounced and goes through a maximum as pH values in the range of from pH 1 to pH 5, as will be shown in the examples hereinafter.

The acid solutions of urea thus inherently contain the acid salts corresponding to the acid with which these solutions are acidified, and the two expressions "urea in aqueous acid solution" (or medium) and "acid salts of urea" are used interchangeably herein as designating the same egg-treating reagents.

The concentration of the urea in acid solution, i.e. of the acid salt of urea, employed in the process of my invention is important in obtaining the desired alternation of egg properties. In general, the higher the concentration of acid urea salt, the more effective is its action in plasticizing the eggs and in making them translucent and transparent. The solutions which are near the saturation point with respect to urea are best for producing transparency. However, a solution containing as little as 10% by weight urea salt will produce swollen, rubbery eggs which usually are translucent with only minor amounts of transparent eggs, and which may be useful for some purposes.

The acid solution of urea is employed in the amount necessary to suspend the eggs and to introduce into them an amount of urea sufficient to produce the desired alteration in egg properties. Normally it is employed in a large excess, since it is possible to use and reuse the solution until it is substantially exhausted with respect to its urea salt content. It then may be regenerated by the addition of more urea and more acid as required.

It is a feature of the hereindescribed process that it may be carried out satisfactorily at ambient temperature, thereby eliminating the necessity of providing special heating or cooling equipment. In general, temperatures ranging from the freezing point of the acid treating medium to about 150°, are suitable, with room or ambient temperature being preferred.

The time of treatment with the acid urea salt obviously is dependent upon the other variables, including acid urea salt concentration, temperature, egg source, and conditions of egg pretreatment. Although the reaction occurs very rapidly, i.e. in a matter of one or two hours, in a normal and convenient plant procedure, the eggs may be cooked and cooled in the morning, transferred to storage brine, allowed to attain equilibrium with the storage brine at room temperature over the afternoon, drained free of brine, washed, and then treated with the acid urea solution overnight.

The end point of the treatment with acid area salt is somewhat empirical in that the judgment and experience of the operator must be relied upon to determine when the optimum egg condition has been reached. When it has, the egg properties will be found to have been improved most surprisingly and beneficially.

Whereas the cooked, untreated eggs are hard, the urea treated eggs are plastic and rubbery.

Whereas the cooked untreated eggs are opaque, the urea tracted eggs are translucent or even transparent, resembling natural eggs in this regard.

Whereas the cooked untreated eggs are white, the urea treated eggs have a more natural color tone.

Whereas the cooked untreated eggs are of relatively small size, the urea treated eggs are swollen to as much as double their size.

In addition, the urea treated eggs are tough, cover the hook well, and stay on the hook tenaciously when used as fish bait.

In comparison to the process set forth in my companion patent application Ser. No. 601,133 referred to above, the swelling of the egg is carried on much more rapidly. Thus in some cases at 70° F. an increase in translucency and a swelling to at least 125% of the original egg volume is accomplished within two hours of treatment. Where the treatment is of such short duration, some distortion of the eggs may occur. This disappears, however, as equilibrium is brought about as the treating period progresses.

Secondly, the swelling of the eggs occurs to a much greater extent. Doubling of the egg size commonly may be achieved and in extreme cases egg swelling ratios, i.e. the ratio of the volume of the treated egg to the volume of the untreated egg, may be as high as 3.75. This means that the eggs may be increased in volume to almost four times their original volumes, and without sacrifice of, and even with enhancement of, the other attributes necessary to fish egg baits. The importance of doubling or tripling the amount of merchantable bait eggs obtained from a given amount of feedstock, and in making useful products from undersized eggs which otherwise could not be used as feedstock, is obvious.

To suit special applications, or to meet special needs, the properties of the fish egg baits of my invention may be improved still further by dyeing them in a selected color, or by treating them with preservatives to increase their shelf life.

For this purpose, the conventional fish egg dyes may be employed. These include Rhodamine, Fast Red ALS or Acid Orange. These dyes are soluble in aqueous acid urea solutions and accordingly may be incorporated directly in the acid urea-containing reaction medium.

Similarly, the acid urea treating solutions may be fortified with suitable bactericides or fungicides such as alkyl-dimethyl-benzyl-ammonium chloride, or N-(lauroyl colaminoformylmethyl) pyridinium chloride. When thus treated, the eggs will not readily develop mold when incubated at 120° F. for two weeks.

By combining the dye and the bactericide-fungicide in the acid urea treating solution, starting with the cooked eggs, it is possible simultaneously to color the eggs, treat them with preservative, enlarge the eggs, render them translucent, and render them plastic all in one step. The eggs then may be drained and packed in isotonic solution in hermetically sealed jars in the usual manner.

As noted above, the residual acid urea solution may be reused in the treatment of subsequent batches of eggs, with fortification by the addition of more urea, acid, dye and preservatives as required.

EXAMPLES

The process of the invention and its novel fish egg bait products are illustrated by the following examples:

EXAMPLE 1

In the following series of tests, singled King Salmon (Onchoryinchus tsawytscha) eggs obtained from Lake Michigan salmon were immersed in saturated sodium chloride brine for 18 minutes and then drained for 60 minutes and stored under refrigeration at 40° F. in dry pack.

For each of the following separate experiments, 20 grams of eggs taken from refrigerated storage were suspended in 50 ml. of saturated sodium brine at 65° F. for 72 hours. They then were treated with 2.4 ml. of dilute formaldehyde prepared by diluting 10 ml. of commercial 37% formalin with 68.8 ml. of water. This corresponds to a solution concentration of 5.1% by weight formaldehyde and a solution density of 1.013 at 64.4° F.

The dilute formaldehyde solution was added to the brine, and the eggs in the formaldehyde-brine medium thereafter permitted to stand at 65° F. for 16 hours.

Next the eggs were washed free of the formaldehyde-containing brine, resuspended in saturated brine, and cooked for 30 minutes at 201° F. They then were cooled rapidly to 65° F. and allowed to stand 24 hours in saturated brine at 65° F.

Five individual eggs were measured for average egg volume by the displacement method, washed free of surface brine and immersed in 50 ml. of an aqueous solution containing 40% by weight urea and varying milliliter amounts of dilute phosphoric acid, as shown in the table below.

The dilute phosphoric acid was prepared by diluting 10 ml. of commercial 85% phosphoric acid with 90ml. of distilled water. The pH of the urea-phosphoric acid mixture was determined at the recording times using a glass electrode and a Beckman model. After 24 hours of soaking at room temperature, the eggs were examined for transparency and texture. The results were as follows:

TABLE I

| Experiment No. | Ml. 5.1% Formaldehyde | Urea $H_3PO_4$ Solution | Average Egg Volume | | |
|---|---|---|---|---|---|
| | | | Initial | After 2 Hr | After 24 Hr |
| 27 | 1 | 10% | .32 | .62 | .68 |
| 28 | 2 | 10% | .34 | .60 | .62 |
| 29 | 3 | 10% | .30 | .52 | .54 |
| 30 | 4 | 10% | .30 | .50 | .52 |
| 31 | 1 | 20% | .32 | .62 | .74 |
| 32 | 2 | 20% | .34 | .58 | .70 |
| 33 | 3 | 20% | .32 | .58 | .66 |
| 34 | 4 | 20% | .32 | .56 | .62 |
| 35 | 1 | 40% | .32 | .56 | .84 |
| 36 | 2 | 40% | .34 | .56 | .78 |
| 37 | 3 | 40% | .34 | .56 | .80 |
| 38 | 4 | 40% | .32 | .52 | .66 |

| Experiment No. | pH of Solution at 24 Hr | Swelling Ratio at 24 Hr | Comments |
|---|---|---|---|
| 27 | 2.4 | 1.94 | Opaque solid center, soft. |
| 28 | 2.4 | 1.82 | Opaque, Harder than No. 27 Hangs well on hook. |
| 29 | 2.5 | 1.80 | Translucent, good consistency Hangs well on hook. |
| 30 | 2.4 | 1.80 | Transparent to translucent Rubbery gel. |
| 31 | 2.5 | 2.25 | Soft, opaque. |
| 32 | 2.5 | 2.06 | Translucent, rubbery gel. |
| 33 | 2.5 | 2.06 | Transparent, rubbery gel. |
| 34 | 2.5 | 1.94 | Transparent, less rubbery than No. 33. |

TABLE I-continued

| | | | |
|---|---|---|---|
| 35 | 2.8 | 2.62 | Translucent, weak gel. |
| 36 | 2.8 | 2.29 | Transparent, rubbery gel. |
| 37 | 2.8 | 2.35 | Transparent, rubbery gel. |
| 38 | 2.8 | 2.06 | Transparent, some splits. |

The foregoing data show the remarkable effect on the rate of swelling of King Salmon eggs in urea solutions which have the initial pH of the solution adjusted to between pH 2.6 to 5.1. The trend toward increased swelling in acid urea solutions is evident after only two hours. The straight urea sample showed an average egg volume of 0.46 at the end of two hours while all the acid-urea-treated samples showed average egg volumes varying from 0.48 ml. to 0.60 ml.

After 24 hours of treatment the results were even more striking. The straight urea sample had an average volume of 0.42 while the eggs treated with acid urea solution had egg volumes varying from 0.50 to 0.72 ml.

EXAMPLE 2

This example illustrates the application of the process invention to Chum Salmon eggs using a urea treating solution acidified with citric acid.

In the following series of experiments, singled Chum Salmon (Onchorynchus nerka) eggs obtained from Petersburg, Alaska were immersed in saturated sodium chloride brine for 14 minutes and then drained for 60 minutes to remove the major portion of the brine. The drained eggs were packed dry in plastic pails and stored under refrigeration at 35° F. until used.

For each separate experiment 20 grams of eggs were taken from cold storage, suspended in 50 ml. of saturated sodium chloride brine for 24 hours and then treated with formaldehyde.

Each 24 gram sample of eggs in brine was treated with 1.2 ml. of 5.1% formaldehyde solution for 16 hours and then cooked at 201° F. in fresh brine containing no formaldehyde. The cooking times were as shown in the accompanying table. The cooked eggs were cooled to 65° F. and held in the brine for 24 hours.

To test the effect on egg swelling of a citric acid acidified urea solution, the effect on swelling of a solution containing 40% by weight of urea was contrasted with the effect of 50 ml. of a solution containing 40% by weight of urea and 3 ml. of 10% by weight solution of citric acid.

Three individual eggs from each cooking time were measured for their average egg volumes and then immersed in the respective urea-containing treating solutions. At the end of two hours and 24 hours of swelling the transparency and average egg volume were determined. The results are given below:

TABLE II

| | | Chum Salmon Eggs in 40% Urea Solution | | | | |
|---|---|---|---|---|---|---|
| Experiment No. | Cooking Time in Min. at 201° F. | Average Egg Volume | | | Solution pH | Swelling Ratio |
| | | Initial | At 2 Hr | At 24 Hr | | |
| 7 | 50 | 0.3 ml | 0.47 ml | 0.53 ml | 6.5 | 1.76 |
| 8 | 70 | 0.23 | 0.40 | 0.4 | 6.4 | 1.74 |
| 9 | 90 | 0.26 | 0.43 | 0.43 | 6.4 | 1.65 |

| Experiment No. | Remarks on 24 Hr. Egg |
|---|---|
| 7 | Transparent, some solid centers. |
| 8 | Transparent, some solid centers. |
| 9 | Transparent, some solid centers. |

TABLE III

| | | Chum Salmon Eggs in 40% Urea Plus Citric Acid | | | | |
|---|---|---|---|---|---|---|
| Experiment No. | Cooking Time in Min. at 201° F. | Average Egg Volume | | | Solution pH | Swelling Ratio |
| | | Initial | At 2 Hr | At 24 Hr | | |
| 10 | 50 | 0.26 ml | 0.47 ml | 0.60 ml | 3.4 | 2.31 |
| 11 | 70 | 0.26 | 0.53 | 0.80 | 3.4 | 3.07 |
| 12 | 90 | 0.23 | 0.53 | 0.86 | 3.3 | 3.73 |

| Experiment No. | Remarks on 24 Hr. Egg |
|---|---|
| 10 | Transparent, rubbery, Commercial grade. |
| 11 | Transparent, soft texture, Commercial grade. |
| 12 | Transparent, soft texture, Commercial grade. |

The data of Tables II and III show that Chum Salmon eggs demonstrate markedly improved swelling ratios when swollen in urea solutions acidified with citric acid to a pH of 3.4. In the case of the eggs treated with urea solution acidified with citric acid, but not in the case of those treated with urea per se, the swelling ratio gets markedly larger as the cooking time is extended. In fact, when eggs which had been cooked for 90 minutes were treated, they nearly quadrupled in size.

EXAMPLE 3

This example illustrates the treatment of King Salmon eggs with urea solution acidified with hydrochloric acid, i.e. with urea hydrochloride.

Singled King Salmon eggs from Lake Michigan were immersed for 15 minutes in saturated sodium chloride, drained for 60 min., and stored in dry pack at 35° F. for two months.

94 pounds of raw dry pack eggs taken from cold storage were suspended in 30 gallons of 62½% saturated sodium chloride brine in a wooden barrel for one hour at 60° F. 12 Fluid ounces of 37% formalin was added and the mixture held at 60° F. for 1½ hours before cooking.

The cooking was accomplished by direct steam injection without change of brine during which time the temperature was maintained consistently over 200° F. for a total cooking period of 30 minutes. The brine then was drained off and 50° tap water added to cool the eggs to 70° F.

The cooled eggs then were placed in 62½% saturated sodium chloride brine for overnight storage.

The eggs at this point were opaque, white, had hard centers and had a pH of 6.0. They were removed from the storage brine, given a flash washing with tap water to remove surface brine and then used in the following experiments which were designed to show the effect of pH and urea hydrochloride solution on the swelling ratio.

The total volume of 5 individual examples was measured by displacement and each 5 egg sample then immersed in 50 ml. of solution containing 40% by weight urea plus varying amounts of hydrochloric acid, plus sufficient water to hold total water addition constant as tabulated in Table III. These samples were allowed to stand at ambient temperature. The pH of the treating solution was determined before use. The average egg volume was determined before swelling after two hours treatment and after 20 hours treatment. The results are given in Table IV.

level of a solution of urea-hydrochloride. A preferred pH range for effectuating the swelling accordingly lies within the broad range of pH 1 to pH 5.

Samples of the swollen eggs were analyzed by standard methods for their urea content. The urea content was found to be more than 50% of the total weight of the eggs, dry solids basis. This indicates a substantial uptake of urea by the eggs during the swelling process.

EXAMPLE 4

This example illustrates the treatment of Coho Salmon eggs pretreated with varying amounts of formaldehyde prior to cooking, and then swollen by treatment with a dilute phosphoric acid solution of urea.

Coho Salmon (onchorynchus kisutch) eggs were singled and brined for 14 minutes in saturated sodium chloride brine, drained for 60 minutes and stored in sealed plastic containers under refrigeration at 33° F. before use. In each of the following experiments 20 grams of eggs taken from cold storage were placed in 50 ml. of saturated sodium chloride brine for 24 hours.

Then to each of five 20 grams samples of the eggs in brine was added 1.5, 2.5, 3.5, 4.5 and 5.5 ml. respectively, of 5.1% formaldehyde solution (density 1013 at 64.4° F. The formaldehyde solution was allowed to react with the eggs at 65° F. for 16 hours. It then was separated from the eggs and each egg batch sample placed in 50 ml. of saturated brine.

The eggs were cooked at 201° F. for 30 minutes, cooled rapidly to 65° F. and retained in the saturated brine for a storage period of 72 hours.

Five cooked egg samples from each formaldehyde treatment were washed free of surface brine and immersed in 50 ml. of 50% aqueous urea solution i.e. 40%

Table IV

| Experiment No. | Ml. of 31% HCl Added | Ml. of Water Added | Initial pH | Average Egg Volume | | |
|---|---|---|---|---|---|---|
| | | | | Initial | At 2 Hrs. | At 24 Hrs. |
| 13 | .00625 | 4.19 | 5.3 | 0.32 ml | 0.42 ml | 0.44 ml |
| 14 | .0312 | 4.17 | 3.8 | 0.32 | 0.44 | 0.48 |
| 15 | .05 | 4.15 | 3.5 | 0.32 | 0.46 | 0.52 |
| 16 | .1 | 4.1 | 3.1 | 0.34 | 0.50 | 0.64 |
| 17 | .15 | 4.05 | 2.9 | 0.32 | 0.48 | 0.62 |
| 18 | .25 | 3.95 | 2.6 | 0.34 | 0.50 | 0.72 |
| 19 | .5 | 3.7 | 2.5 | 0.32 | 0.48 | 0.66 |
| 20 | 2.4 | 1.8 | 1.7 | 0.34 | 0.48 | 0.54 |
| 21 | 4.2 | 0 | 1.6 | 0.32 | 0.44 | 0.52 |

| Experiment No. | Swelling Ratio | % Urea in dry matter | Comment |
|---|---|---|---|
| 13 | 1.375 | 55.7% | Opaque, tough texture |
| 14 | 1.5 | 63.0% | Opaque to Translucent, tough texture, good on hook |
| 15 | 1.625 | 63.2% | Translucent to transparent, tough. |
| 16 | 1.88 | 70.9% | Translucent to transparent, tough. |
| 17 | 1.937 | 74.4% | Translucent, not as tough as No. 16. |
| 18 | 2.117 | 63.0% | Translucent to transparent, rubbery. |
| 19 | 2.06 | 63.4% | Translucent to transparent, some split. |
| 20 | 1.588 | 60.6% | Opaque to translucent, soft. |
| 21 | 1.625 | 50.65% | Opaque to translucent, soft. |

The data of Table IV are graphed in FIG. 1 of the drawings, which shows swelling ratios vs. pH of the hydrochloric acid-containing urea treating solutions. All points on the graph show greater swelling than at pH 6. There is a pronounced maximum of swelling at a level of about pH 2.6. This is at substantially the pH urea by weight having added thereto 2 ml. of dilute phosphoric acid prepared by diluting 10 ml. of concentrated 85% by weight phosphoric acid with 90 ml. of distilled water. The swelling ratios of the eggs were determined after 24 hours treatment with the acidified urea solution. The results are given below.

TABLE V

| Experi- | Ml. of 5.1% Formaldehyde | Average Egg Volume | | Swelling |

TABLE V-continued

| ment No. | Added | Initial | At 2 Hr | At 24 Hr | Ratio |
|---|---|---|---|---|---|
| 22 | 1.5 | 0.32 ml | 0.58 ml | 0.80 ml | 2.50 |
| 23 | 2.5 | 0.30 | 0.56 | 0.70 | 2.33 |
| 24 | 3.5 | 0.30 | 0.54 | 0.70 | 2.33 |
| 25 | 4.5 | 0.30 | 0.52 | 0.64 | 2.13 |
| 26 | 5.5 | 0.32 | 0.56 | 0.68 | 2.12 |

| Experiment No. | pH of Solution at 24 Hr | pH of Egg | Comments |
|---|---|---|---|
| 22 | 2.9 | 2.9 | Very transparent, good on hook, rubbery. |
| 23 | 2.8 | 2.9 | Very transparent, good on hook, rubbery. |
| 24 | 2.9 | 2.8 | Very transparent, good on hook, rubbery. |
| 25 | 2.8 | 2.8 | Very transparent, good on hook, rubbery. |
| 26 | 2.8 | 2.9 | Some split. |

These data show that excellent commercial grade transparent fish egg bait is prepared from Coho Salmon eggs at formaldehyde levels of from 1.5 to about 5.5 ml. of 5.1% formaldehyde solution per 20 grams of eggs. The swelling ratios become somewhat smaller as the formaldehyde concentration in the treating bath goes up. However, in all cases the product eggs were very transparent, hung well on a fish hook, and had a rubbery or plastic consistency. The pH of the product egg closely followed the pH of the treating solution after 24 hours treatment.

EXAMPLE 5

This example illustrates the treatment of King Salmon eggs with a wide range of urea-phosphoric acid treating solutions.

Lake Michigan King Salmon eggs were singled, brined for 18 minutes in saturated sodium chloride, drained for 60 minutes, packed in sealed plastic pails and stored under refrigeration at 33° F. for two months before use.

In each of the following 12 experiments, 20 gram samples of the eggs taken from cold storage were suspended in 50 ml. of aqueous 25% saturated sodium chloride brine for 72 hours at 68° F.

An amount of formaldehyde corresponding to the various amounts listed below were added to the brined egg samples which then were allowed to stand for 16 hours. The eggs were removed from the formaldehyde-containing brine, placed in fresh 25% saturated brine and cooked at 201° F. for 30 minutes after which they were cooled rapidly to 68° F. The cooked cooled eggs were held at 68° F. in 25% saturated brine for 24 hours.

Five treated eggs from each formaldehyde treated sample were washed free of surface brine and immersed in three concentrations i.e. 10%, 20% and 40% by weight, of urea to which had been added 2 ml. of dilute phosphoric acid prepared by mixing 10 ml. of concentrated 85% by weight phosphoric acid with 90 ml. of distilled water. The results are given in Table VI.

TABLE VI

| Experiment No. | Ml. 5.1% Formaldehyde | Urea $H_3PO_4$ Solution | Average Egg Volume | | |
|---|---|---|---|---|---|
| | | | Initial | After 2 Hr | After 24 Hr |
| 27 | 1 | 10% | .32 | .62 | .68 |
| 28 | 2 | 10% | .34 | .60 | .62 |
| 29 | 3 | 10% | .30 | .52 | .54 |
| 30 | 4 | 10% | .30 | .50 | .52 |
| 31 | 1 | 20% | .32 | .62 | .74 |
| 32 | 2 | 20% | .34 | .58 | .70 |
| 33 | 3 | 20% | .32 | .58 | .66 |
| 34 | 4 | 20% | .32 | .56 | .62 |
| 35 | 1 | 40% | .32 | .56 | .84 |
| 36 | 2 | 40% | .34 | .56 | .78 |
| 37 | 3 | 40% | .34 | .56 | .80 |
| 38 | 4 | 40% | .32 | .52 | .66 |

| Experiment No. | pH of solution at 24 Hr | Swelling Ratio at 24 Hr | Comments |
|---|---|---|---|
| 27 | 2.4 | 1.94 | Opaque, solid center, soft. |
| 28 | 2.4 | 1.82 | Opaque, harder than No. 27, hangs well on hook. |
| 29 | 2.5 | 1.80 | Translucent, good consistency, hangs well on hook. |
| 30 | 2.4 | 1.80 | Transparent to translucent, rubbery gel. |
| 31 | 2.5 | 2.25 | Soft, opaque. |
| 32 | 2.5 | 2.06 | Translucent, rubbery gel. |
| 33 | 2.5 | 2.06 | Transparent, rubbery gel. |
| 34 | 2.5 | 1.94 | Transparent, less rubbery than No. 33. |
| 35 | 2.8 | 2.62 | Translucent, weak gel. |
| 36 | 2.8 | 2.29 | Transparent, rubbery gel. |
| 37 | 2.8 | 2.35 | Transparent, rubbery gel. |
| 38 | 2.8 | 2.06 | Transparent, some splits. |

The foregoing data show that fish eggs may be enlarged with a wide range of concentrations of urea-phosphoric acid solution, i.e. concentrations of from 10% to 40% by weight. The resulting eggs have swelling ratios of from 1.80 to 2.35 and accordingly in some instances more than doubled in size. The formaldehyde employed in a preferred formaldehyde pretreatment may vary from about 1 to 4 ml. of 5.1% formaldehyde for 20 grams of eggs. The pH of the product eggs corresponded to the pH of the swelling baths after 24 hours.

EXAMPLE 6

This example illustrates the treatment of King Salmon eggs with urea treating solution acidified with diglycollic acid in one instance and with phosphoric acid in the other instance.

The salmon eggs used in this series of experiments were King Salmon eggs prepared in identical manner prior to swelling, following the procedure given in detail in Example 3, except that 14 fluid ounces of 37% Formalin was used instead of the 12 fluid ounces recorded in Example 3.

Five egg samples of the pretreated eggs were enlarged at selected pH levels. This was accomplished by washing the pretreated eggs free of surface brine and immersing them in 50 ml. of 40% by weight urea solution. A series of such mixtures was set up and a selected amount of diglycollic acid added to each, as recorded in Table VII. After the recorded treating time, the average egg volumes were determined by the standard displacement technique. The results are given below.

TABLE VII

| Experiment No. | Grams of Diglycollic Acid added | Initial pH | Average Egg Volume | | |
|---|---|---|---|---|---|
| | | | Initial | After 2 Hr | After 24 Hr |
| 39 | .005 | 5.4 | .28 | .48 | .36 |
| 40 | .01 | 4.5 | .26 | .48 | .36 |
| 41 | .025 | 4.0 | .28 | .42 | .36 |
| 42 | .05 | 3.7 | .30 | .40 | .46 |
| 43 | .075 | 3.5 | .28 | .38 | .44 |
| 44 | 0.1 | 3.15 | .26 | .44 | .48 |
| 45 | 0.5 | 3.0 | .26 | .48 | .50 |
| 46 | 1 | 2.75 | .26 | .46 | .50 |
| 47 | 2 | 2.70 | .28 | .48 | .52 |
| 48 | 4 | 2.6 | .28 | .44 | .48 |

| Experiment No. | Swelling Ratio | Final Solution pH | Comments |
|---|---|---|---|
| 39 | 1.18 | 5.6 | Translucent, tough gel. |
| 40 | 1.38 | 4.5 | Translucent, good consistency. |
| 41 | 1.28 | 4.2 | Translucent, tough gel. |
| 42 | 1.53 | 4.0 | Translucent to transparent tough gel. |
| 43 | 1.57 | 3.5 | Transparent, tough gel. |
| 44 | 1.85 | 3.3 | Transparent to translucent. |
| 45 | 1.92 | 3.0 | Transparent, weaker gel than No. 47. |
| 46 | 1.92 | 2.8 | Transparent, not as hard as No. 7. |
| 47 | 1.86 | 2.7 | Transparent, good consistency. |
| 48 | 1.71 | 2.6 | Transparent, good consistency. |

Figure 2:
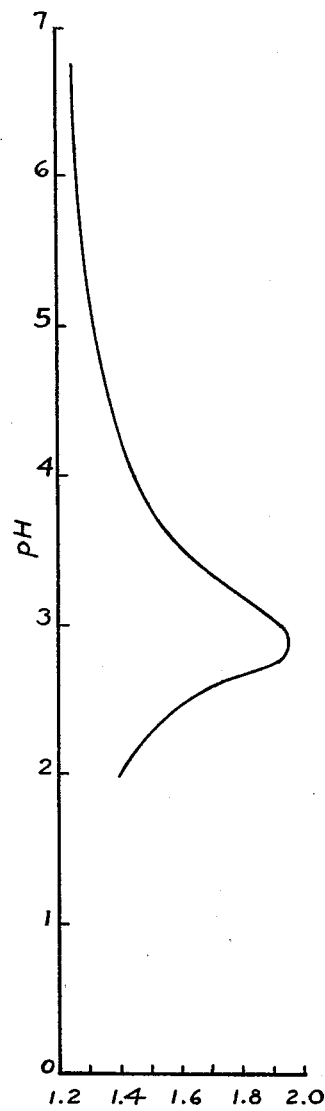
FIG. 2 (urea phosphate) illustrates the effect of the degree of acidity of the treating solution on the swelling of fish eggs upon treating them with a solution of urea acidified with phosphoric acid.

The data of Table VII are plotted in FIG. 2 of the drawing which shows the effect of pH on egg swelling ratio when diglycollic acid is the treating agent. It is to be noted that some swelling occurs at all pHs below 6, with a pronounced maximum occurring at a pH of about 2.9. This corresponds closely to the maximum swelling value of about 2,6 when hydrochloric acid is the acidifying agent, as shown in FIG. 1.

Between pH of 2.6 to 3.7 the product eggs were transparent; between 3.7 and 5,4, translucent. In all cases the eggs had a good consistency and hung well on a fish hook.

EXAMPLE 7

This example illustrates the effect of pH on swelling ratios when using as an egg treating agent an aqueous urea solution acidified with phosphoric acid.

The procedure of Example 6 was followed with the exception that phosphoric acid was substituted for diglycollic acid. The results are given below.

TABLE VIII

| Experiment No. | Ml. 85% H₃PO₄ | Initial Solution pH | Average Egg Volume | | |
|---|---|---|---|---|---|
| | | | Initial | After 2 Hr | After 24 Hr |
| 49 | .005 | 6.8 | 0.28 | 0.34 | 0.36 |
| 50 | .01 | 4.0 | 0.30 | 0.40 | 0.36 |
| 51 | .025 | 3.6 | 0.26 | 0.38 | 0.44 |
| 52 | .05 | 3.4 | 0.28 | 0.42 | 0.44 |
| 53 | .1 | 3.15 | 0.28 | 0.44 | 0.52 |
| 54 | .25 | 2.9 | 0.28 | 0.48 | 0.56 |
| 55 | .5 | 2.75 | 0.30 | 0.46 | 0.56 |
| 56 | 1.0 | 2.5 | 0.28 | 0.44 | 0.52 |
| 57 | 3.0 | 2.3 | 0.26 | 0.36 | 0.42 |
| 58 | 5.0 | 2.2 | 0.28 | 0.38 | 0.42 |

| Experiment No. | Final Solution pH | Egg pH | Swelling Ratio | Comments |
|---|---|---|---|---|
| 49 | 6.5 | 6.9 | 1.28 | Translucent, good consistency |
| 50 | 4.3 | 4.3 | 1.20 | Translucent, good consistency |
| 51 | 3.75 | 3.6 | 1.69 | Translucent, good consistency |
| 52 | 3.6 | 3.4 | 1.57 | Transparent to translucent some split |
| 53 | 3.4 | 3.2 | 1.86 | Translucent core, transparent outer layer |
| 54 | 2.95 | 3.1 | 2.00 | Transparent to translucent rubbery gel |
| 55 | 2.7 | 2.8 | 1.87 | Transparent to translucent |

TABLE VIII-continued

| | | | | |
|---|---|---|---|---|
| | | | | rubbery gel |
| 56 | 2.4 | 2.9 | 1.87 | Transparent, rubbery gel good on hook |
| 57 | 2.2 | 2.4 | 1.62 | Transparent, soft rubbery gel |
| 58 | 2.1 | 2.5 | 1.50 | Transparent, rubbery gel good consistency |

Figure 3:
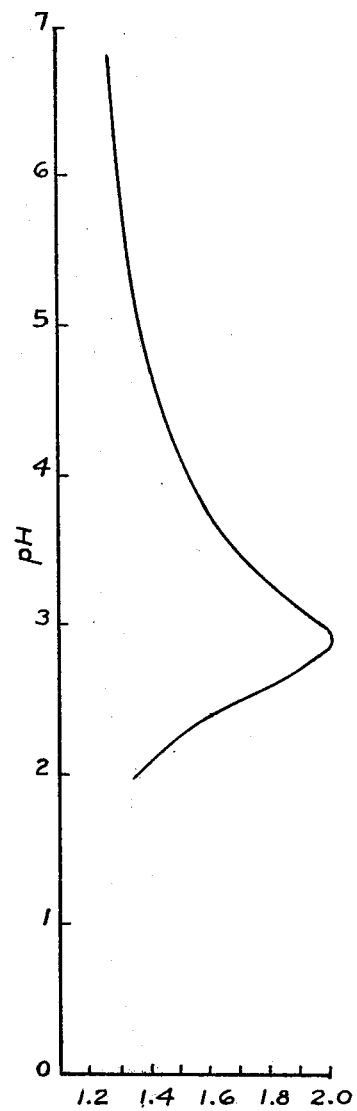
FIG. 3 (urea diglycollate) illustrates the effect of the degree of acidity of the treating solution on the swelling of fish eggs upon treating them with a solution of urea acidified with diglycollic acid.

The foregoing data are graphed in FIG. 3 of the drawings which plots the pH vs. egg swelling ratios for the various ureaphosphoric acid treating solutions. Again an improvement was noted in the degree of egg swelling at all pHs below a value of pH 6, with maximum improvement being noted at a pH of about 2.9. This corresponds exactly to the maximum of pH 2.9 observed in the case of diglycollic acid, FIG. 2, and very closely to the maximum of 2.6 observed in the case of hydrochloric acid, FIG. 1.

From pH 2.2 to 2.5 the product eggs were transparent; from pH 2.75 to 3.6, transparent and translucent; and from pH 3.6 to 6.8, translucent. All the eggs had a good rubbery gel consistency and hung well on a fish hook. Their pH corresponded closely to the pH of the urea phosphate swelling solution after 24 hours.

EXAMPLE 8

The procedure of Example 1 is followed with the exception that instead of the phosphoric acid-urea treating agent of that example there is employed a urea treating agent acidified with sulphuric acid or sulphamic acid, or acetic acid, or oxalic acid or tartaric acid. Similar results are obtained.

Having now described my invention in preferred embodiments, I claim:

1. The process of making fish egg bait which comprises:
   a. providing fish eggs, the protein of which is coagulated to a degree sufficient to render the eggs hard and substantially opaque, and
   b. treating the eggs with urea in an aqueous acid medium until the eggs have become swollen, translucent, and plasticized.

2. The process of claim 1 wherein the concentration of the aqueous acid solution of urea lies between 10% by weight urea and a saturated urea solution, and wherein the treating temperature ranges between just above the freezing temperature of the acid urea solution and about 150° F.

3. The urea-containing swollen, translucent and plasticized fish egg bait product of the process of claim 1.

4. The process of making fish egg bait which comprises:
   a. treating fish eggs in a saline solution with a hardening agent for protein until the eggs have become hard and substantially opaque and
   b. treating the eggs with urea in an aqueous acid medium until the eggs have become swollen, translucent or transparent, and plasticized.

5. The process of claim 4 including the preliminary step of soaking the unhardened eggs in a saline solution comprising an aqueous solution of at least one salt of the class containing of sodium chloride and calcium chloride, the saline solution having a salt concentration of from 0.1% saturated to fully saturated with respect to the selected salt, for a time sufficient to toughen the fish egg skins.

6. The process of claim 5 wherein the saline solution comprises a sodium chloride solution.

7. The process of claim 5 wherein the saline solution comprises a calcium chloride solution.

8. The process of claim 5 followed by the step of draining the saline solution from the eggs, storing the eggs under refrigeration for a desired storage period, and thereafter plumping the eggs preliminary to treatment with the protein-hardening agent by suspending them in a saline solution from 0.1% saturated to fully saturated with respect to salt, for a time sufficient to plump the eggs.

9. The process of claim 4 wherein the protein-hardening agent comprises formaldehyde used in the amount of from 0.2, to 0.7 pounds of formaldehyde per 100 pounds of eggs.

10. The process of claim 4 wherein the protein-hardening agent comprises formaldehyde used in the amount of from 0.2 to 0.7 pounds of formaldehyde per 100 pounds of eggs, the saline solution comprises an aqueous solution of sodium chloride having a concentration of from 0.1% saturated to fully saturated with respect to sodium chloride, and wherein the reaction is carried out at a temperature of from just above the freezing point of the mixture to about 150° F. for a time period of at least one hour.

11. The process of claim 9 including the step of cooking the formaldehyde-treated eggs in an aqueous urea solution at a temperature of from about 150° F. to about the boiling temperature of the solution, thereby further hardening the eggs.

12. The process of claim 4 wherein the urea solution contains from 10% by weight urea to sufficient urea to saturate the solution with respect thereto, and wherein the soaking temperature is from just above the freezing point of the urea solution to about 150° F.

13. The process of claim 4 wherein the aqueous acid medium has a pH no greater than 6.

14. The process of claim 4 wherein the aqueous acid medium has a pH of from 1 to 5.

15. The process of claim 4 wherein the acid comprises at least one member of the group consisting of sulfuric acid, hydrochloric acid, phosphoric acid, sulfamic acid, acetic acid, citric acid, diglycollic acid, and tartaric acid.

16. The process of claim 15 wherein the acid is sulfuric acid.

17. The process of claim 15 wherein the acid is hydrochloric acid.

18. The process of claim 15 wherein the acid is phosphoric acid.

19. The process of claim 15 wherein the acid is acetic acid.

20. The process of claim 15 wherein the acid is diglycollic acid.

21. The process of making fish egg bait which comprises:
   a. toughening the skins of fish eggs by soaking the eggs in brine having a salt concentration of from 0.1% to fully saturated with respect to salt, at a temperature of from just above the freezing temperature of the brine to 150° F. for a time sufficient to toughen the fish egg skins, b. hardening the eggs in the brine solution by reacting them with a formaldehyde protein coagulant used in amount of from 0.2 to 0.7 pounds of formaldehyde per 100 pounds eggs, c. cooking the formaldehyde-treated eggs in brine solution at a temperature of from 175° F. to the boiling point of the brine solution for a time sufficient to opacify the eggs and harden them further and d. treating the egg with aqueous urea solution having a urea concentration of from 10% by weight to saturated with respect to urea at a temperature of from just above the freezing point of the solution to about 150° F. for a time sufficient to plasticize and swell the eggs and render them substantially translucent or transparent, e. the urea solution containing at least one acid of the group consisting of sulfuric acid, hydrochloric acid, phosphoric acid, sulfamic acid, acetic acid, citric acid, diglycollic acid, oxalic acid and tartaric acid used in amount sufficient to impart to the solution a pH of from 1 to 5.

22. The fish egg bait made by the process of claim 21.

* * * * *